(12) United States Patent  
Matsuda

(10) Patent No.: US 8,973,698 B2  
(45) Date of Patent: Mar. 10, 2015

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/997,180

(22) PCT Filed: Dec. 24, 2010

(86) PCT No.: PCT/JP2010/007485  
§ 371 (c)(1),  
(2), (4) Date: Jun. 21, 2013

(87) PCT Pub. No.: WO2012/085977  
PCT Pub. Date: Jun. 28, 2012

(65) Prior Publication Data  
US 2013/0270026 A1   Oct. 17, 2013

(51) Int. Cl.  
*B62K 11/00*  (2013.01)  
*B62J 1/18*   (2006.01)  
*B62K 11/04*  (2006.01)  
(Continued)

(52) U.S. Cl.  
CPC . *B62K 11/00* (2013.01); *B62J 1/18* (2013.01); *B62K 11/04* (2013.01); *B62K 2204/00* (2013.01); *B62K 2208/00* (2013.01); *B60Y 2200/12* (2013.01); *B62M 7/02* (2013.01); *B60L 11/1818* (2013.01); *Y02T 10/7088* (2013.01); *Y02T 10/7005* (2013.01); *Y02T 90/121* (2013.01); *Y02T 90/14* (2013.01)  
USPC .......................................................... 180/220

(58) Field of Classification Search  
USPC ..................... 180/220, 65.1, 65.31  
See application file for complete search history.

(56) References Cited

U.S. PATENT DOCUMENTS 5,577,747 A * 11/1996 Ogawa et al. ................. 180/220  
2004/0069549 A1 * 4/2004 Ono et al. .................... 180/65.8  
(Continued)

FOREIGN PATENT DOCUMENTS

EP   2130713 A1   12/2009  
JP   04358980 A   12/1992  
(Continued)

OTHER PUBLICATIONS

Japanese Patent Office, International Search Report of PCT/JP2010/007485, WIPO, Mar. 29, 2011, 2 pages.  
(Continued)

*Primary Examiner* — Tony Winner  
(74) *Attorney, Agent, or Firm* — Alleman Hall McCoy Russell & Tuttle LLP

(57) ABSTRACT

An electric motorcycle is provided. The motorcycle includes: a charging connector to which is removably attached an outside charging connector connected to an outside electric power supply; a battery that charges with electric power supplied from the outside electric power supply when the outside charging connector is connected to the charging connector, and discharges the electric power to the motor; a rear frame connected to a front frame of a vehicle body; and a seat on which a driver or passenger is seated and a cowling for covering the vehicle body, the seat and cowling being mounted to the rear frame, wherein the seat or cowling is pivotally or removably attached to the rear frame, and the charging connector is placed in a space in the vicinity of the rear frame, the space being opened and closed by the seat or cowling.

7 Claims, 3 Drawing Sheets

(51) Int. Cl.
*B62M 7/02* (2006.01)
*B60L 11/18* (2006.01)

(56) References Cited

U.S. PATENT DOCUMENTS

| | | | |
|---|---|---|---|
| 2007/0137914 A1* | 6/2007 | Kawase | 180/218 |
| 2012/0097463 A1* | 4/2012 | Iwata et al. | 180/65.1 |
| 2012/0103710 A1* | 5/2012 | Atsuchi et al. | 180/65.31 |
| 2012/0103716 A1* | 5/2012 | Fujihara et al. | 180/220 |
| 2012/0125702 A1* | 5/2012 | Bergfjord | 180/65.1 |
| 2013/0105240 A1* | 5/2013 | Tsai et al. | 180/219 |

FOREIGN PATENT DOCUMENTS

| | | |
|---|---|---|
| JP | 05083863 A | 4/1993 |
| JP | 05105146 A | 4/1993 |
| JP | 08322159 A | 12/1996 |
| JP | 2001277904 A | 10/2001 |
| JP | 2004210074 A | 7/2004 |

OTHER PUBLICATIONS

European Patent Office, Extended European Search Report of 10861011.4.

* cited by examiner

ELECTRIC MOTORCYCLE

TECHNICAL FIELD

The present invention relates to an electric motorcycle which activates a motor for generating driving power by electric power discharged from a battery for storing the electric power, to rotate a drive wheel.

BACKGROUND ART

In recent years, for the purpose of environmental protection, etc., an electric motorcycle incorporating as a driving power source a motor actuated by electric energy stored in a battery has been developed. A charging connector to which an outside charging connector connected to an outside electric power supply is removably attached is built into such an electric motorcycle to charge a battery built into the electric motorcycle with electric power supplied from the outside electric power supply (see e.g., Patent Literature 1).

According to Patent Literature 1, a member having the same shape as that of a fuel tank is provided in a location where the fuel tank is placed in a conventional motorcycle in which an engine is mounted, and the charging connector is provided inside of the member. An internal space of the member is opened and closed by a cap similar to a lid of the fuel tank.

CITATION LIST

Patent Literature

Patent Literature 1: Japanese-Laid Open Patent Application Publication No. 2004-210074

SUMMARY OF THE INVENTION

Technical Problem

However, in this configuration, even in a state in which the charging connector is exposed or connected to the outside electric power supply, with the cap opened in the middle of charging or just after the charging, the motorcycle may drive by mistake.

Accordingly, an object of the present invention is to effectively prevent the motorcycle from driving by mistake in the state in which the charging connector is exposed or connected to the outside electric power supply.

Solution to Problem

An electric motorcycle of the present invention which drives a drive wheel by driving power generated by a motor, comprises a charging connector to which an outside charging connector connected to an outside electric power supply is removably attached; a battery configured to be charged with electric power supplied from the outside electric power supply in a state in which the outside charging connector is connected to the charging connector, and to discharge the electric power stored therein to supply the electric power to the motor; a rear frame connected to a front frame of a vehicle body; and a seat on which a driver or passenger is seated and a cowling for covering the vehicle body, the seat and the cowling being mounted to the rear frame, wherein the seat or the cowling is pivotally or removably attached to the rear frame, and wherein the charging connector is placed in a space in the vicinity of the rear frame, the space being configured to be opened and closed by the seat or the cowling.

In accordance with this configuration, the charging connector is placed in the space which is opened and closed by the seat or the cowling. By pivoting or removing the seat or the like to open the space, the battery can be charged. Unless the seat or the like is appropriately attached to the rear frame to close the space, the driver or the passenger cannot take a stable straddle attitude. Therefore, it becomes possible to prevent a situation in which the motorcycle drives by mistake in a state in which the charging connector is exposed or connected to the outside charging connector, for example, in the middle of charging or just after the charging.

The charging connector may be a quick charging connector with a connector surface directed upward, and the seat or the cowling may be provided above the charging connector.

In accordance with this configuration, by inserting the outside charging connector into the space from above, the battery can be charged, and thus a charging operation can be easily carried out. Since the battery can be charged in a short time, the charging operation is not burdensome. Since the seat or the cowling is placed above the charging connector, it becomes possible to prevent the charging connector from getting wet by rain water, etc.

The electric motorcycle may comprise an opening-closing sensor for detecting whether the space is closed or opened; and a control unit for inhibiting the motor from being activated when the opening-closing sensor detects that the space is opened.

In accordance with this configuration, it becomes possible to avoid a situation in which the motorcycle drives in a state in which the seat or the like is not appropriately attached.

The electric motorcycle may comprise a space forming member provided on the rear frame and defining the space, and the space may have a volume greater than the charging connector.

In accordance with this configuration, an extra region of the space defined by the space forming member can be utilized as a space in which articles may be accommodated.

The above and further objects, features and advantages of the present invention will more fully be apparent from the following detailed description of preferred embodiments with accompanying drawings.

Advantageous Effects of the Invention

In accordance with the present invention, it becomes possible to avoid a situation in which a motorcycle drives by mistake in a state in which a charging connector is exposed or connected to an outside electric power supply.

DESCRIPTION OF THE EMBODIMENTS

Hereinafter, an embodiment of the present invention will be described with reference to the drawings. The stated directions are from the perspective of a driver straddling an electric motorcycle. Throughout the drawings, the same or corresponding components are identified by the same reference symbols, and will not be described in repetition.

Figure 1:
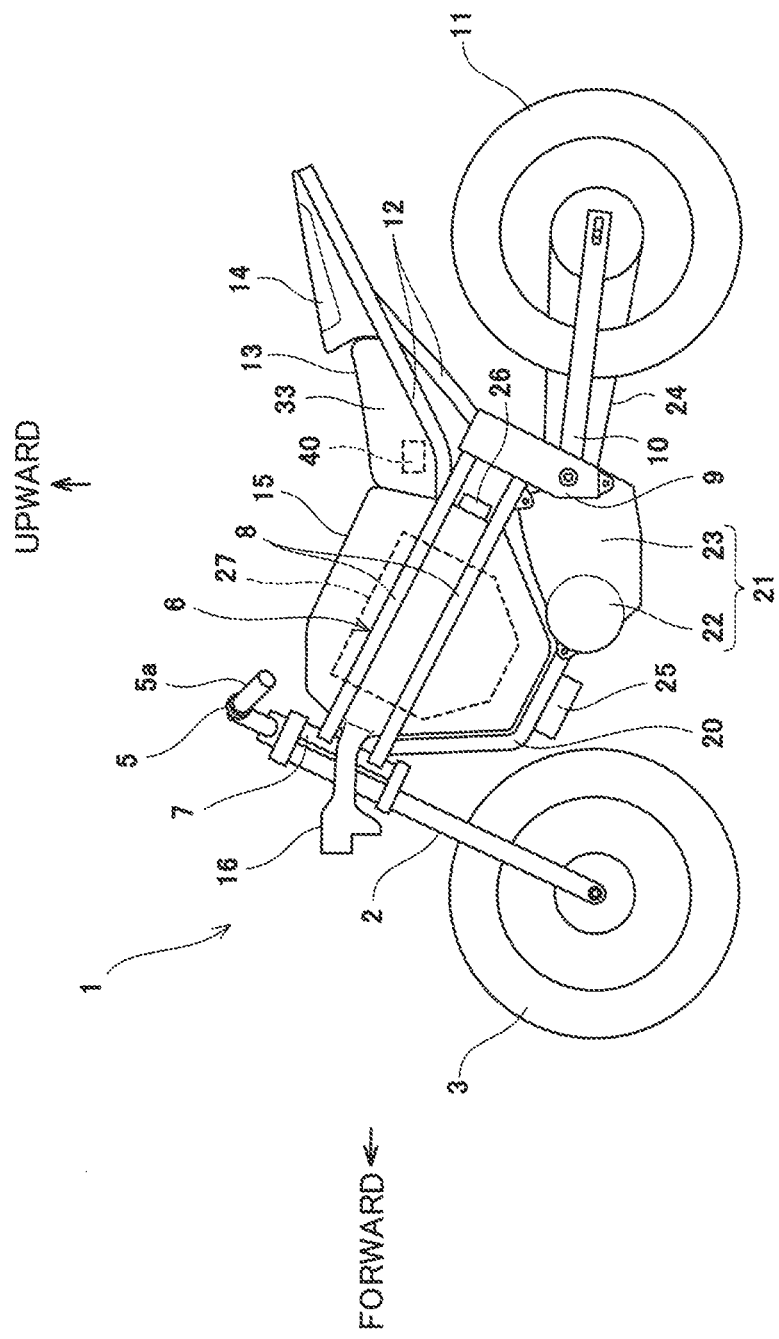
FIG. 1 is a left side view of an electric motorcycle according to an embodiment of the present invention.

FIG. 1 is a left side view of an electric motorcycle according to the embodiment of the present invention. As shown in FIG. 1, the electric motorcycle 1 includes a front fork 2 extending substantially vertically with a predetermined caster angle, and a front wheel 3 which is a driven wheel is rotatably mounted to a lower portion of the front fork 2. A lower portion of a steering shaft (not shown) is coupled to an upper portion of the front fork 2. A bar-type handle 5 is attached to an upper portion of the steering shaft. An accelerator grip 5a is attached on a portion of the handle 5 which is gripped by the driver's right hand. The steering shaft is rotatably inserted into a head pipe 7 defining a vehicle body frame 6. The front wheel 3 is steered by the driver's operation for rotating the handle 5.

The vehicle body frame 6 includes the head pipe 7, and a pair of right and left and a pair of upper and lower main frame members 8 which extend rearward such that they are inclined slightly downward. Rear portions of the main frame members 8 are coupled to a pair of right and left pivot frame members 9, respectively. A front portion of a swing arm 10 extending in a substantially forward and rearward direction is mounted to the pivot frame members 9 such that the swing arm 10 is pivotable around the front end portion. A rear wheel 11 which is a drive wheel is rotatably mounted to a rear portion of the swing arm 10. A seat frame member 12 supporting a front seat 13 which can be straddled by the driver and a rear seat 14 which can be straddled by a passenger are coupled to the main frame members 8 and to the pivot frame members 9.

A battery case 15 for accommodating a plurality of batteries 27 is placed between the pair of right and left main frame members 8. The battery case 15 is fastened to the main frame members 8. The battery case 15 is placed such that it overlaps with the main frame members 8 when viewed from side. The main frame members 8 are located in a center portion of the battery case 15 in a height direction when viewed from the side. An introduction duct 16 is provided in a location forward relative to the battery case 15 and in the vicinity of the head pipe 7 to take in the ram air from forward and guide the ram air to inside of the battery case 15. A rear end of the introduction duct 16 is coupled to an upper portion of a front portion of the battery case 15.

The vehicle body frame 6 includes down frame members 20 extending from the head pipe 7, along a space below the battery case 15 such that the down frame members 20 are inclined to be lower than the main frame members 8. An electric motor unit 21 is fastened to rear end portions of the down frame members 20. The electric motor unit 21 is fastened to the main frame members 8 and to the pivot frame members 9. That is, the main frame members 8 and the pivot frame members 9 are coupled to the down frame members 20 via the electric motor unit 21, and the electric motor unit 21 defines a portion of the vehicle body frame 6. The electric motor unit 21 is placed below the main frame members 8 and the battery case 15 and forward relative to the pivot frame members 9. The electric motor unit 21 includes an electric motor 22 for generating driving power and a transmission 23 integrally mounted to a rear portion of the electric motor 22. An inverter 25 is mounted to the down frame members 20 in a location forward relative to the electric motor unit 21. A controller 26 is mounted to a rear portion of the battery case 15. The electric motor 22 is supplied with the electric power from the batteries 27 via the inverter 25 and thereby generates rotational power. The transmission 23 changes a speed of the generated rotational power and transmits the rotational power to the rear wheel 11 via a chain 24. A charging connector 40 is placed below the front seat 13.

As described above, in the electric motorcycle 1 of the present embodiment, in the vehicle body fame 6, the main frame members 8, the down frame members 20 and the electric motor unit 21 construct a front frame, which is placed forward relative to a center in the forward and rearward direction between the front wheel 3 and the rear wheel 11, or a rear portion of which is located slightly rearward relative to the center. The pivot frame members 9, the swing arm 10, and the seat frame member 12 construct a rear frame placed rearward relative to the front frame. The rear frame is attached with members such as the seats 13 and 14 which can be seated by the driver and the passenger, steps on which feet of the driver and the passenger who are seated on the seats 13 and 14 are put, etc., to enable the driver and the passenger to take stable straddle attitudes during driving.

Figure 2:
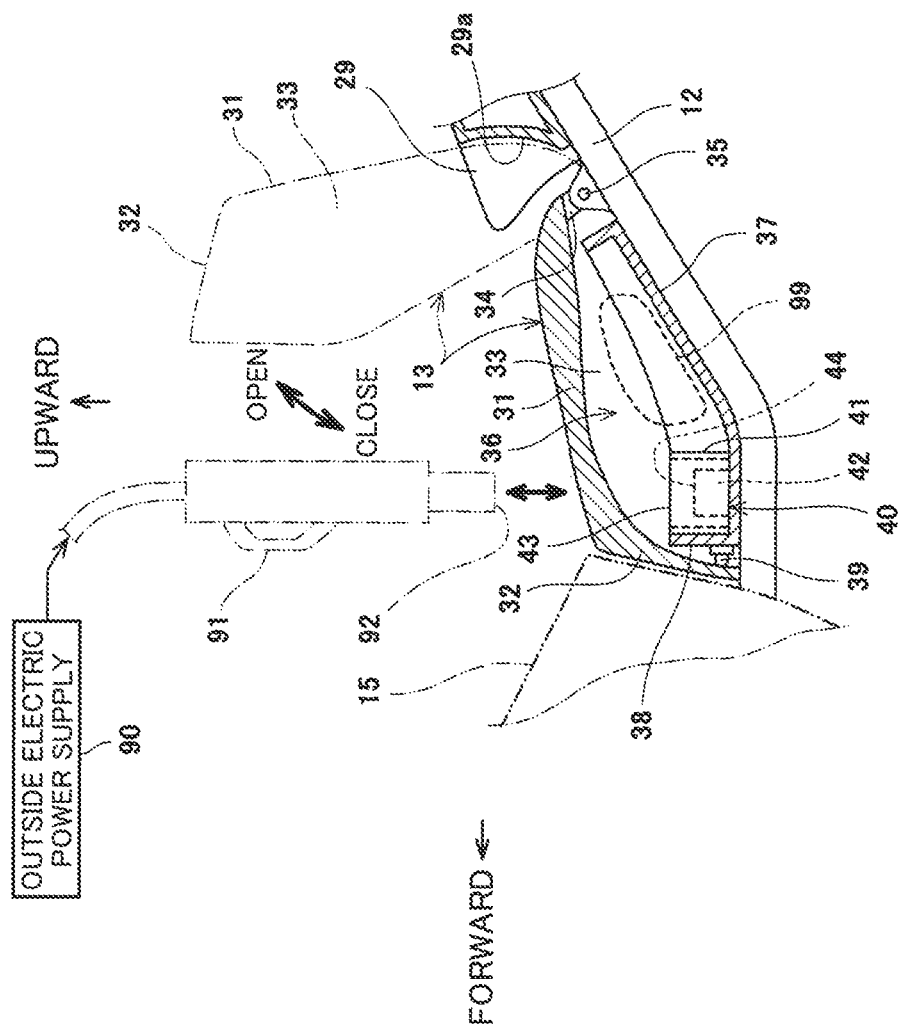
FIG. 2 is a cross-sectional view showing a region surrounding a driver seat of FIG. 1.

FIG. 2 is a cross-sectional view of the front seat 13 of FIG. 1. The front seat 13 has a seat section 31 on which the driver can be seated. In a front end portion of the seat section 31, a front wall portion 32 extending downward is provided. At right and left sides of the seat section 31, there are provided a pair of side wall portions 33 extending downward and connected to the front wall portion 32 (the right side wall 33 is shown in FIG. 2 and the left side wall portion 33 is shown in FIG. 1). A bracket member 34 protruding downward is provided at a rear end portion of the seat section 31. The bracket member 34 is pivotally mounted to the seat frame 12 via a pivot 35. This allows the front seat 13 to be pivotable with respect to the seat frame 12 between a closed position indicated by a solid line of FIG. 2 and an open position indicated by a two-dotted line of FIG. 2.

In a state in which the front seat 13 is in the closed position, an outer front surface of the front wall portion 32 is placed in close proximity to an outer rear surface of the battery case 15 and faces the outer rear surface of the battery case 15, and the seat section 31 extends substantially horizontally. In the state in which the front seat 13 is in the closed position, the driver can be stably seated on the seat section 31, and can take a proper straddle attitude. In a state in which the front seat 13 is in the open position, the front wall portion 32 is located above the pivot 35, and the seat section 31 extends substantially vertically. In the state in which the front seat 13 is in the open position, the driver cannot take the proper straddle attitude, but a space 36 in the vicinity of the seat frame member 12 is opened.

When the front seat 13 is pivoted from the closed position toward the open position, a rear upper end portion (i.e., a portion of the seat section 31 which is located above the pivot 35 in the state in which the front seat 13 is in the closed position) of the seat section 31 moves to a location rearward relative to the pivot 35. In view of this, a seat support member 29 placed rearward relative to the front seat 13 and supporting the rear seat 14 (see FIG. 1) may have at its front end portion a recessed portion 29a which is recessed rearward. This allows the front seat 13 to be pivoted to move toward the open position in a state in which the rear upper end portion of the seat section 31 is placed within the recessed portion 29a. Therefore, an angular range between the closed position of the front seat 13 and the open position of the front seat 13 increases, which makes the space 36 wide open.

A space forming member 37 of a container shape having an open upper portion or a tray shape is supported on the seat frame member 12. In the state in which the front seat 13 is in the closed position, the space forming member 37 is placed in the space 36 which is below the seat section 31 of the front seat 13 and is in the vicinity of the seat frame member 12. In the illustrated example, an outer bottom surface of the space forming member 37 is supported on the seat frame member 12. Alternatively, the space forming member 37 may be placed to overlap with the seat frame member 12 when viewed from side so that a space which is in the vicinity of the seat frame member 12 and is below the front seat 13 in the closed position may be formed below the seat frame member 12 to have a greater dimension.

The space forming member 37 has a front wall 38 extending vertically upward in its front end portion. A front surface of the front wall 38 is placed in close proximity to an inner rear surface of the front wall portion 32 of the front seat 13 in the closed position such that the front surface faces the inner rear surface. An opening-closing switch 39 is attached on a front lower portion of the front wall 38. In the state in which the front seat 13 is in the closed position, the front wall portion 32 of the front seat 13 turns ON the opening-closing switch 39, which outputs a signal (hereinafter this signal will be referred to as "ON signal") indicating that the front seat 13 is closed and the space 36 is closed. When the front seat 13 is pivoted from the closed position toward the open position, the front seat 13 moves away from the opening-closing switch 39, which outputs a signal (hereinafter this signal will be referred to as "OFF signal") indicating that the front seat 13 is open and the space 36 is open.

The charging connector 40 is placed inside of the space forming member 37. The charging connector 40 includes a cylindrical housing 41 and a receptacle 42 accommodated into the housing 41. At least one side of the housing 41 is open, thereby forming a charging port 43 in the housing 41. The charging connector 40 is placed in the space 36 with the charging port 43 directed upward. Therefore, a center axis of the cylindrical housing 41 is directed substantially vertically. The receptacle 42 includes a connector surface 44 removably attached to an outside charging connector 91 connected to an outside electric power supply 90. The connector surface 44 is directed upward with the charging port 43 directed upward.

The entire charging connector 40 has a smaller volume than the space forming member 37. For example, the entire charging connector 40 has a volume which is less than a half of the volume of the space forming member 37. In addition, the charging connector 40 is placed at one side (forward side in the illustrated example) in the forward and rearward direction, in the space 36 defined by the space forming member 37. Because of this, the driver or passenger can utilize a region of the space 36 defined by the space forming member 37, which region is not occupied by the charging connector 40, as an article accommodating section which accommodates an article 99 such as luggage of the driver or passenger or maintenance tools.

Figure 3:
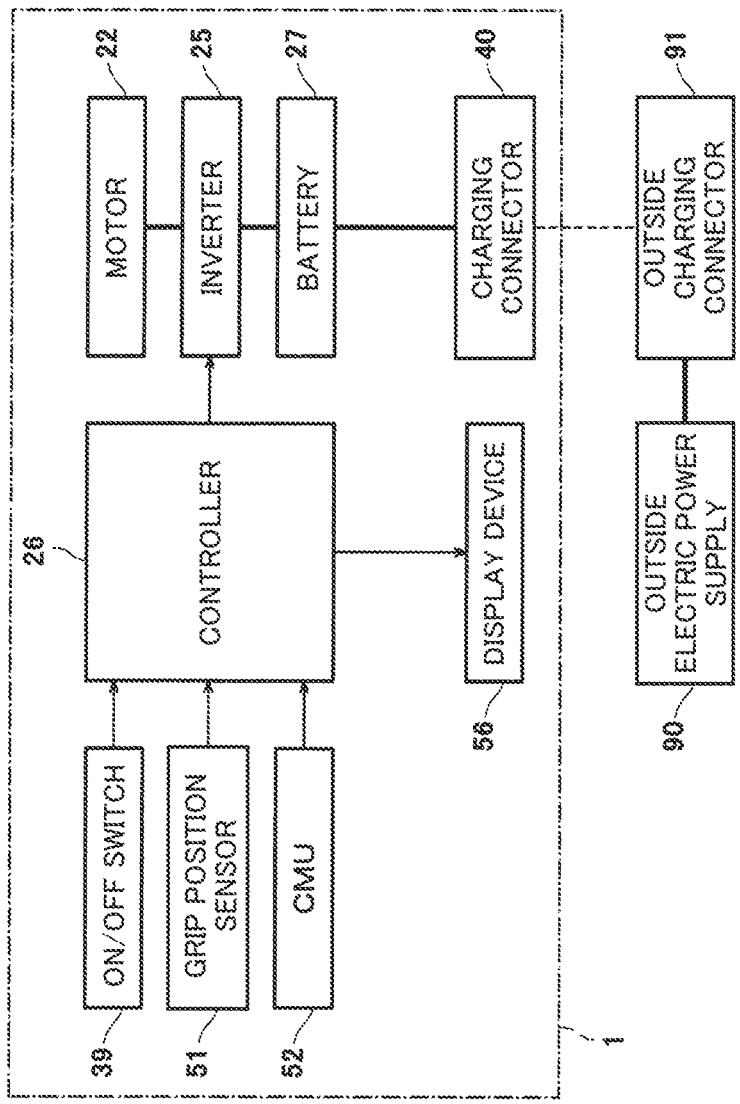
FIG. 3 is a block diagram showing a configuration of a control system of the electric motorcycle of FIG. 1.

FIG. 3 is a block diagram showing a configuration of a control system of the electric motorcycle 1 of FIG. 1. In FIG. 3, the components within a region surrounded by one-dotted line are components mounted in the electric motorcycle 1. As shown in FIG. 3, the batteries 27 are electrically connected to the charging connector 40 built into the electric motorcycle 1. In a state in which the outside charging connector 91 is mounted to the charging connector 40, the batteries 27 are charged with the electric power from the outside electric power supply 90. Note that the outside electric power supply 90 and the outside charging connector 91 are placed in suitable locations to be accessible from the electric motorcycle 1.

The charging connector 40 is so-called a quick charging connector. For example, as the charging connector 40, there is a single-phase or three-phase coupler type charging connector, or a plug and socket type charging connector. The batteries 27 are chargeable with a DC current. Therefore, in a case where an AC current flows between the charging connector 40 and the outside charging connector 91, an AC/DC converter is provided between the charging connector 40 and the batteries 27. In a case where the DC current flows between the charging connector 40 and the outside charging connector 91, it is not necessary to mount the AC/DC converter in the electric motorcycle 1, which can achieve space saving in the electric motorcycle 1. The use of the quick charging connector as described above allows high-voltage electricity to be flowed during charging, which can reduce the time required for a charging operation.

The batteries 27 are configured to discharge the electricity stored therein to supply the electricity to the electric motor 22. As described above, the discharged DC electricity is converted into AC electricity by the switching operation performed by the inverter 25. The electric motor 22 is activated by the AC electricity generated by the inverter 25 and supplied to the electric motor 22.

A grip position sensor 51 and a cell monitoring unit 52 (hereinafter will be referred to as "CMU") are connected to an input side of a controller 26 mounted in the electric motorcycle 1, together with the above stated opening-closing switch 39. A display device 56 is connected to an output side of the controller 26 together with the above stated inverter 25. The grip position sensor 51 detects an operation position of the accelerator grip 5a (see FIG. 1). The CMU 52 detects an amount of the electricity stored in the batteries 27. The controller 26 controls the switching operation performed by the inverter 25 based on the operation position of the accelerator grip 5a which is detected by the grip position sensor 51, thereby controlling a current and frequency of the AC electricity to be supplied to the electric motor 22 and hence driving power generated by the electric motor 22. When the amount of the electricity stored in the batteries 27, which is detected by the CMU 52, is less than a predetermined value, the controller 26 causes the display device 56 to display information indicating that the amount of the electricity stored in the batteries 27 is less than the predetermined value. This allows the driver or passenger to carry out the charging operation for the batteries 27 at an appropriate time.

Turning back to FIG. 2, to carry out the charging operation, the driver or passenger stops the electric motorcycle 1 near the outside electric power supply 90, and pivots the front seat 13 to the open position to open the space 36 upward. Thus, the charging connector 40 can be exposed. The charging connector 40 is placed in an end portion at an opposite side of the pivot 35 in a direction (substantially in a forward and rearward direction) in which the seat section 31 of the front seat 13 in the closed position extends. In the illustrated example, the charging connector 40 is placed in a front end portion of the space 36. Because of this, by pivoting the front seat 13 around the pivot 35 toward the open position, the charging connector 40 is suitably exposed without interfering with the seat section 31, which makes it possible to easily carry out the charging operation.

Then, the driver or passenger holds the outside charging connector 91 connected to the outside electric power supply 90, and moves the outside charging connector 91 into the space 36, to mechanically and electrically connect the outside charging connector 91 to the charging connector 40. The charging connector 40 is exposed such that the charging port 43 is opened upward and the connector surface 44 is directed upward. Therefore, merely by moving down the outside charging connector 91 with the connector surface 92 of the outside charging connector 91 directed downward, the connector surface 92 can be moved into the housing 41 through the charging port 43, the outside charging connector 91 can be received into the charging port 43, and the connector surface 92 can be fitted to the connector surface 44. Thus, the driver or passenger can mechanically and electrically connect the outside charging connector 91 to the charging connector 40 without a need to perform a complicated operation in which a direction of the connector surface 92 of the outside charging connector 91 is changed within the space.

In the case where the quick charging connector is used as the charging connector 40, the time of the charging operation can be reduced. However, to attain a structure required to stably flow a current of great magnitude, there is a tendency that the charging connector 40 and the outside charging connector 91 increase in size. In view of this, in the present embodiment, the layout of the charging connector 40 is devised to allow the driver or passenger to easily carry out the charging operation. As a result, the time required for the charging operation can be reduced, and a complicated charging operation can be avoided.

After the charging operation, the outside charging connector 91 is detached from the charging connector 40 and the front seat 13 is returned to the closed position, so that the driver can take an appropriate straddle attitude. In this state, the charging connector 40 is covered with the front seat 13. In the state in which the front seat 13 is in the closed position, the charging connector 40 is not exposed to outside. Unless the front seat 13 is in the closed position, the driver cannot straddle the front seat 13 and the electric motorcycle 1 virtually cannot be driven. Thus, the structure of the front seat 13 makes it possible to prevent a situation in which the electric motorcycle 1 drives by mistake in the state in which the charging connector 40 is exposed.

Turning back to FIG. 3, in a state in which the opening-closing switch 39 is outputting the OFF signal, the controller 26 causes the inverter 25 to be deactivated to prevent a situation in which the electric power is supplied to the electric motor 22 and thereby the electric motor 22 is activated, irrespective of the operation position of the accelerator grip 5a (see FIG. 1). Thus, a situation in which the electric motorcycle 1 drives by mistake can be prevented by electric control. In a state in which the opening-closing switch 39 is outputting the OFF signal, the controller 26 causes the display device 56 to display information indicating that the front seat 13 (see FIG. 2) is not in the closed position. This allows the driver or passenger to be informed of a reason why the electric motor 22 is deactivated, and to displace the front seat 13 to the appropriate closed position so that the driver or passenger can take an appropriate straddle attitude.

Although the embodiment of the present invention has been described above, the above described configuration can be suitably changed. For example, the front seat is not limited to one which is pivotable, but may be removably attached to the seat frame 12. In a case where two seats which are the front seat 13 for the driver and the rear seat 14 for the passenger are provided like the present embodiment, the front seat 13 and the rear seat 14 may be pivotable or removably attached, or only the rear seat 14 may be pivotable or removably attached, instead of the configuration in which only the front seat 13 is pivotable and removably attached.

It is sufficient that a space near the rear frame 12 defining the vehicle body is openable and closable, and the charging connector 40 is placed in the space which makes it difficult for the driver take an appropriate straddle attitude in the open state. Therefore, the space is not limited to one formed near the seat frame 12. The space may be formed in a frame defining a rear portion of the vehicle body and placed near the front seat 13, for example, near the pivot frame member.

The member for opening and closing the space in which the charging connector is placed is not limited to the seat on which the driver or passenger can be seated, but may be a cowling covering a front portion, a rear portion or side portions of the vehicle body, or the battery case.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

INDUSTRIAL APPLICABILITY

The present invention has advantages that it is possible to effectively prevent a situation in which a motorcycle drives by mistake in a state in which a charging connector is exposed or connected to an outside electric power supply, and is effectively applied to electric motorcycles which can attain the advantages.

REFERENCE CHARACTERS LIST

1 electric motorcycle
3 front wheel
6 vehicle body frame
7 head pipe
8 main frame member
9 pivot frame member
11 rear wheel
12 seat frame member
20 down frame member
21 electric motor unit
22 motor
27 battery
40 charging connector
43 charging port
44 connector surface
90 outside electric power supply
91 outside charging connector

The invention claimed is:

1. An electric motorcycle which drives a drive wheel by driving power generated by a motor, comprising:
 a charging connector to which an outside charging connector connected to an outside electric power supply is removably attached;
 a battery configured to be charged with electric power supplied from the outside electric power supply in a state in which the outside charging connector is connected to the charging connector, and to discharge the electric power stored therein to supply the electric power to the motor;
 a rear frame connected to a front frame of a vehicle body; and
 a seat on which a driver or passenger is seated and a cowling for covering the vehicle body, the seat and the cowling being mounted to the rear frame,
 wherein the seat or the cowling is pivotally or removably attached to the rear frame, and
 wherein the charging connector is placed in a space in the vicinity of the rear frame, the space being configured to be opened and closed by the seat or the cowling, the electric motorcycle further comprising:
 a battery case for accommodating the battery,
 wherein the battery case is placed such that the battery case overlaps with the front frame when viewed from a side,
 wherein the seat is pivotally or removably attached to the rear frame, and wherein the charging connector is placed in a front portion of the space in the vicinity of the rear frame, the space being opened and closed by the seat, and a front wall portion of the seat is in close proximity to a rear surface of the battery case and faces the rear surface of the battery case.

2. The electric motorcycle according to claim 1, wherein the charging connector is a quick charging connector with a connector surface directed upward, and the seat or the cowling is provided above the charging connector.

3. The electric motorcycle according to claim 1, wherein the seat is removably attached to the rear frame.

4. The electric motorcycle according to claim 1, comprising a space forming member provided on the rear frame and defining the space,
   wherein the space has a volume greater than the charging connector.

5. The electric motorcycle according to claim 1, comprising:
   an opening-closing sensor for detecting whether the space is closed or opened; and a control unit for inhibiting the motor from being activated when the opening-closing sensor detects that the space is opened.

6. The electric motorcycle according to claim 1,
   wherein the charging connector is a quick charging connector with a connector surface directed upward, and the seat or the cowling is provided above the charging connector; and
   wherein the seat is attached to the rear frame such that the seat is pivotable around a pivot provided at a rear end portion of the seat.

7. The electric motorcycle according to claim 6, further comprising:
   a space forming member provided on the rear frame and defining the space;
   wherein the space has a greater volume than the charging connector; and
   wherein the charging connector is placed in an end portion of the space at an opposite side of the pivot in a direction in which the seat extends.

* * * * *